(12) United States Patent
Bardi et al.

(10) Patent No.: US 11,357,160 B2
(45) Date of Patent: Jun. 14, 2022

(54) AUTOMATIC CALIBRATION OF SEED TREATER METERING SYSTEM

(71) Applicant: AG GROWTH INTERNATIONAL INC., Winnipeg (CA)

(72) Inventors: Dan Bardi, Winnipeg (CA); Michael Dehaan, Winnipeg (CA); Jared Marr, Winnipeg (CA)

(73) Assignee: AG GROWTH INTERNATIONAL INC., Winnipeg (CA)

( * ) Notice: Subject to any disclaimer, the term of this patent is extended or adjusted under 35 U.S.C. 154(b) by 149 days.

(21) Appl. No.: 16/201,513

(22) Filed: Nov. 27, 2018

(65) Prior Publication Data

US 2019/0159397 A1 May 30, 2019

Related U.S. Application Data

(60) Provisional application No. 62/590,775, filed on Nov. 27, 2017.

(51) Int. Cl.
*A01C 1/06* (2006.01)
*A01N 25/02* (2006.01)

(52) U.S. Cl.
CPC ............... *A01C 1/06* (2013.01); *A01N 25/02* (2013.01)

(58) Field of Classification Search
None
See application file for complete search history.

(56) References Cited

U.S. PATENT DOCUMENTS

| 4,569,233 | A | * | 2/1986 | Rosaen | G01F 15/061 |
| | | | | | 324/207.22 |
| 4,925,096 | A | * | 5/1990 | Gill | A01M 7/0092 |
| | | | | | 239/10 |
| 5,170,656 | A | * | 12/1992 | Draus | G01F 25/0007 |
| | | | | | 73/1.22 |
| 2008/0302986 | A1 | * | 12/2008 | Leahy | G01F 25/0015 |
| | | | | | 251/129.01 |
| 2012/0183675 | A1 | | 7/2012 | Reineccius et al. | |
| 2014/0271243 | A1 | | 9/2014 | Craft et al. | |
| 2015/0359164 | A1 | * | 12/2015 | Bardi | A01C 1/00 |
| | | | | | 47/57.6 |
| 2016/0302352 | A1 | | 10/2016 | Tramp et al. | |

OTHER PUBLICATIONS

Canadian Intellectual Property Office, Office Action in Canadian Patent Application No. 3,025,414 (dated Dec. 10, 2019).

* cited by examiner

*Primary Examiner* — Tabatha L Penny
(74) *Attorney, Agent, or Firm* — Neal, Gerber & Eisenberg LLP (57) ABSTRACT

Disclosed herein is a method of automatically calibrating a liquid treatment system in a seed treater. The method is performed by pumping a seed treatment liquid using a seed treater pump, receiving the seed treatment liquid in a container, detecting when a predetermined volume of seed treatment liquid has filled the container using a first level sensor and a second level sensor and automatically adjusting a flow rate of the liquid in response to a time required to fill the container. Adjusting the flow rate may be done by adjusting a speed of the pump.

11 Claims, 7 Drawing Sheets

FIG. 1

Panel: AutoCal

Calibration Test Result

Pump 1 401  AaBbCcDdEeFfGgHhIiJjKkLlMmNn

Time of last test — 123.1 Sec

Resulting Treating Speed — 123.1 %

AaBbCcD

Target Treating Speed — 123.1 %

Escape Calibration

Use Resulting Treating Speed

Try to reach Target Treating Speed

*FIG. 4*

Calibration Test Result

Pump 2 402 AaBbCcDdEeFfGgHhIiJjKkLlMmNn

Amount Collected in the Test — 1234 mL

Resulting Treating Speed — 123.1 %
AaBbCcD
Target Treating Speed — 123.1 %

Calculated Pump 2 Error — 123.1 %

[Use Resulting Treating Speed] [Accept Calibration Error] [Try to reach Target Treating Speed]

*FIG. 5*

IMPORTANT

415　　Calibration Successful

Treating Speed will be    123.1 %

Please empty the calibration cylinder
before proceeding

Empty
(Push and Hold)        Continue

AUTOMATIC CALIBRATION OF SEED TREATER METERING SYSTEM

TECHNICAL FIELD

The present invention relates generally to agricultural seed treaters and more specifically to techniques for calibrating the flow of a seed treatment fluid in a seed treater.

BACKGROUND

Treating seeds with a liquid coating is a technique that is well known in agriculture. Various types of liquid coatings may be applied to the seeds prior to planting the seeds. A liquid coating on agricultural seeds may contain growth-promoting agents, nutrients, pesticides or the like. It is desirable to calibrate the system that delivers the liquid coating to the seeds to ensure that the correct proportion of treatment liquid is applied to the seeds.

In a conventional seed treater, the liquid delivery system is manually calibrated. To do so, one or more collection cylinders, which may in some cases be transparent cylinders, are provided to enable the user to visually observe the rate of fill and to adjust the pump accordingly. To perform a manual calibration, the user meters treatment from a pump into a collection cylinder over a certain amount of time to determine the flow rate. In order to obtain a more accurate flow rate, the test is repeated several times as it can be difficult to predict the required pump speed to achieve the correct flow rate. Most manual calibration processes require a visual inspection of the liquid level of the collected treatment liquid in the cylinder. Visual inspection can be challenging as the liquid treatments are thick, viscous and designed to coat like paint, thus leaving a residue on the inner surface of the cylinder after the first test is run.

It would be desirable to improve the technology for calibrating the system that delivers a flow of seed treatment fluid in a seed treater to address at least some of the issues outlined above.

SUMMARY

The following presents a simplified summary of some aspects or embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is presented later.

Accordingly, one aspect of the present disclosure is a seed treater having an automatic calibration system. The seed treater comprises a pump for pumping a seed treatment liquid, a container (such as a cylinder) downstream of the pump for receiving the seed treatment liquid from the pump, the container having a first level sensor (e.g. a first level switch) and a second level sensor (e.g. a second level switch) between which a predetermined volume is defined and for signalling when the predetermined volume of seed treatment liquid has filled the container, an applicator for applying the seed treatment to seeds, and a controller for automatically adjusting a flow rate of the liquid in response to a time required to fill the container. Adjusting the flow rate of the liquid may entail adjusting a speed of the pump.

Another aspect of the present disclosure is a method of automatically calibrating a seed treater liquid delivery system pump. The method entails pumping a seed treatment liquid using the seed treater pump, receiving the seed treatment liquid in a container (e.g. a cylinder) downstream of the pump, detecting when a predetermined volume of seed treatment liquid has filled the container using a first level sensor (e.g. a first level switch) and a second level sensor (e.g. a second level switch) and automatically adjusting a flow rate of the liquid in response to a time required to fill the container. Adjusting the flow rate of the liquid may entail adjusting a speed of the seed treater Yet another aspect of the present disclosure is a method of automatically calibrating a liquid treatment system in a seed treater, the method comprising pumping a seed treatment liquid using a seed treater pump, receiving the seed treatment liquid in a container downstream, measuring a volume of seed treatment liquid in the container after a predetermined amount of time, and automatically adjusting a flow rate of the liquid in response to the volume measured after the predetermined amount of time.

Other inventive aspects may become apparent to the skilled person from the following description and drawings.

BRIEF DESCRIPTION OF THE DRAWINGS

Further features and advantages of the present invention will become apparent from the following detailed description, taken in combination with the appended drawings in which.

It will be noted that throughout the appended drawings, like features are identified by like reference numerals.

DETAILED DESCRIPTION

In general, the novel automatic calibration system disclosed herein utilizes a container such as a cylinder to perform the auto-calibration. In one embodiment, the piston is used to determine the liquid level. This eliminates the operator input and allows the calibration to be automated. The flow from the pump moves the piston up and down between the first and second level-indicating devices or level sensors which may be level switches (micro-switches) which define a specific (predetermined) volume. This system uses a controller to automatically adjust the flow rate of the liquid, e.g. by adjusting a speed of the pump. The controller may run a software implementing for example a goal-seeking algorithm to obtain an optimized or desired flow rate without operator input.

Figure 1:
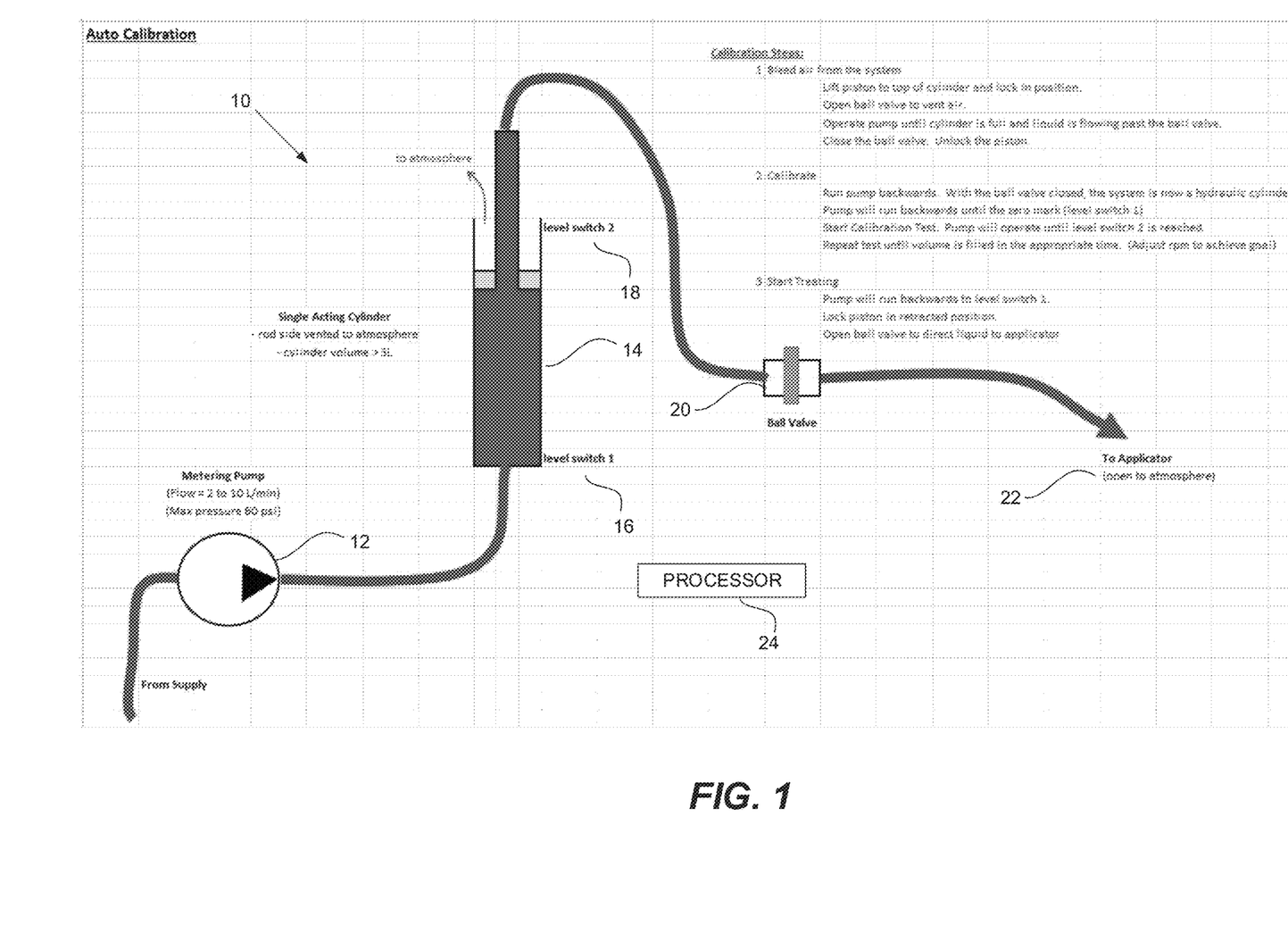
FIG. 1 depicts an automatic calibration system for a seed treater in accordance with an embodiment of the present invention.

FIG. 1 depicts a seed treater 10 having an automatic calibration system in accordance with an embodiment of the present invention. As illustrated in FIG. 1, the seed treater comprises a pump 12 for pumping a seed treatment liquid, a container such as a cylinder 14 downstream of the pump for receiving the seed treatment liquid from the pump, the container having a first level sensor (e.g. first level switch) 16 and a second level sensor (e.g. a second level switch) 18 between which a predetermined volume is defined and for signalling when the predetermined volume of seed treatment liquid has filled the container. In the specific embodiment illustrated in FIG. 1, the system may include a valve 20 downstream of the cylinder that is adapted to be opened and closed and an applicator 22 downstream of the valve for applying the seed treatment to seeds. The seed treater also includes a controller or processor 24 for automatically adjusting a flow rate of the liquid, e.g. by adjusting a speed of the pump, in response to a time required to fill the container 14.

In one embodiment, the container is a single-acting cylinder with a rod side vented to atmosphere.

In one embodiment, the valve is a ball valve controlled by the controller. In other implementations, the valve may be manually controlled.

In one embodiment, the pump is also able to reverse.

In one embodiment, the cylinder comprises a lockable piston. The piston may be lockable in a retracted position.

In one embodiment, the seed treater includes a user interface for displaying calibration information generated by the controller to the user or operator. In another embodiment, the controller in the seed treater communicates the data representing this calibration information to a user device such as a wireless communication device (e.g. a smart phone, tablet, laptop, etc) via a wireless connection. In a variant, the controller may communicate the data via a wired connection to a desktop computer or any other computing device such as a server.

FIGS. 2-6 are exemplary user interfaces that may be displayed for the user. These are presented solely as examples.

Figure 2:
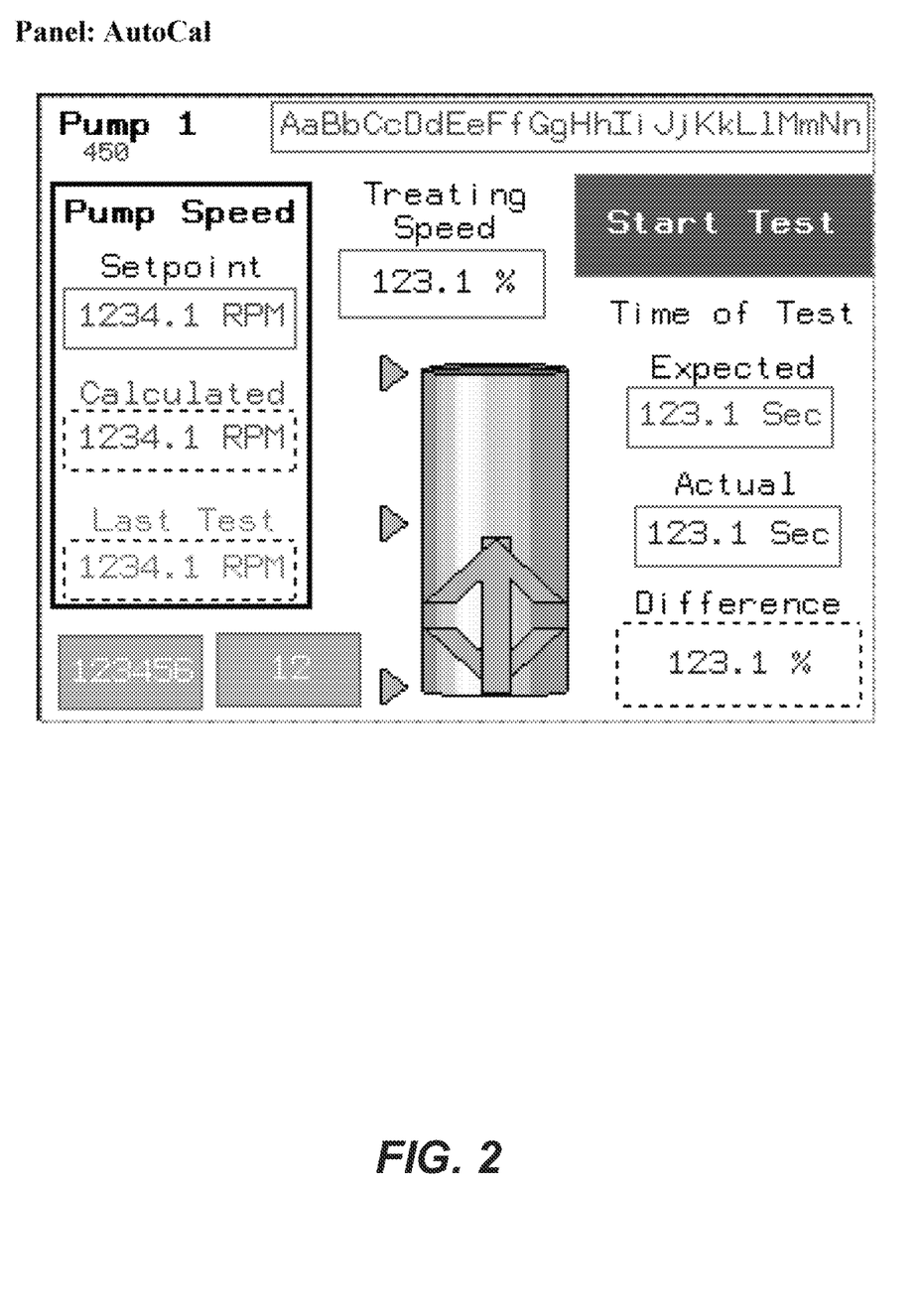
FIG. 2 depicts an exemplary user interface for the automatic calibration system of FIG. 1 showing a main screen.

FIG. 2 depicts an exemplary main screen. This screen displays pump speed, treating speed, and time of test. The screen may have a user interface element (button) to start the test.

Figure 3:
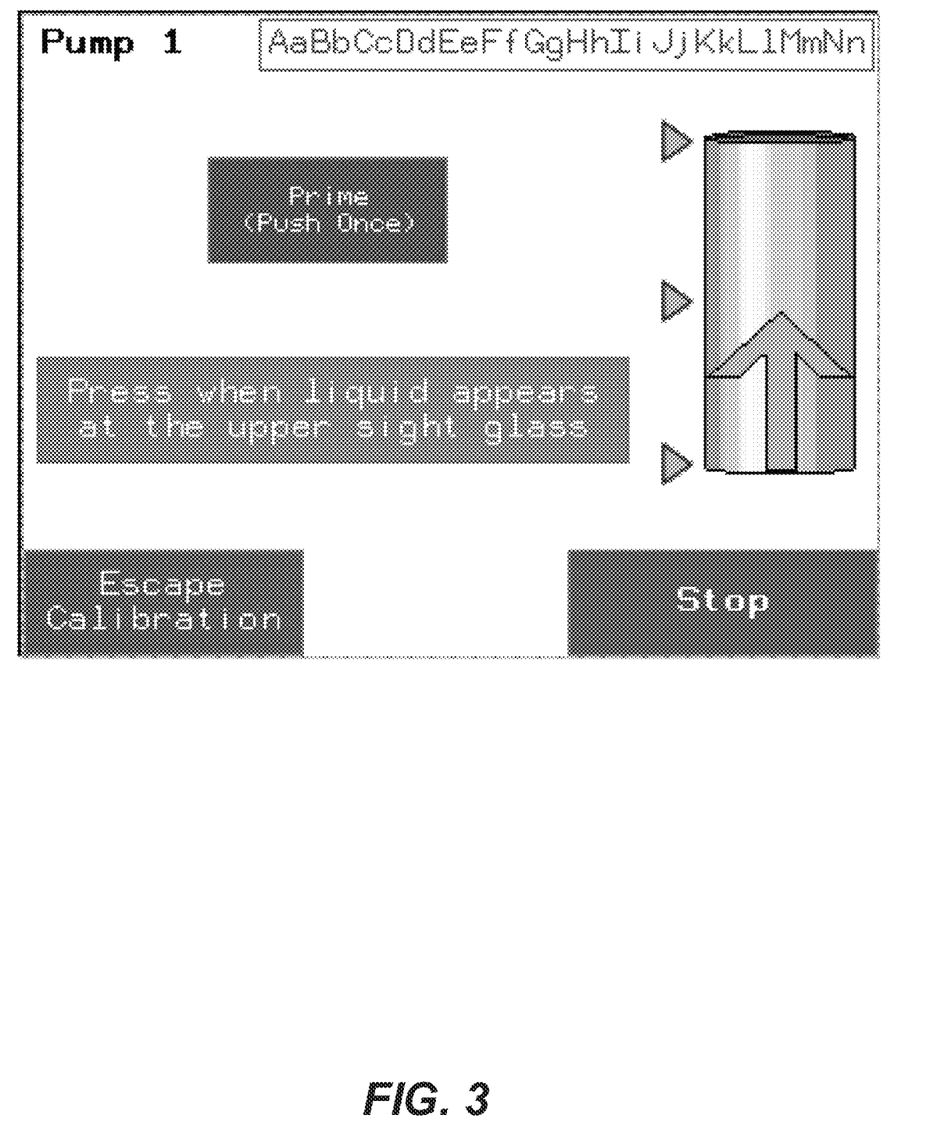
FIG. 3 depicts an exemplary user interface for the automatic calibration system of FIG. 1 showing a prime screen.

FIG. 3 depicts an exemplary prime screen for priming the system. User interface elements are provided to prime the system, indicate when the liquid has reached the top level, stop, and escape the calibration.

Figure 4:
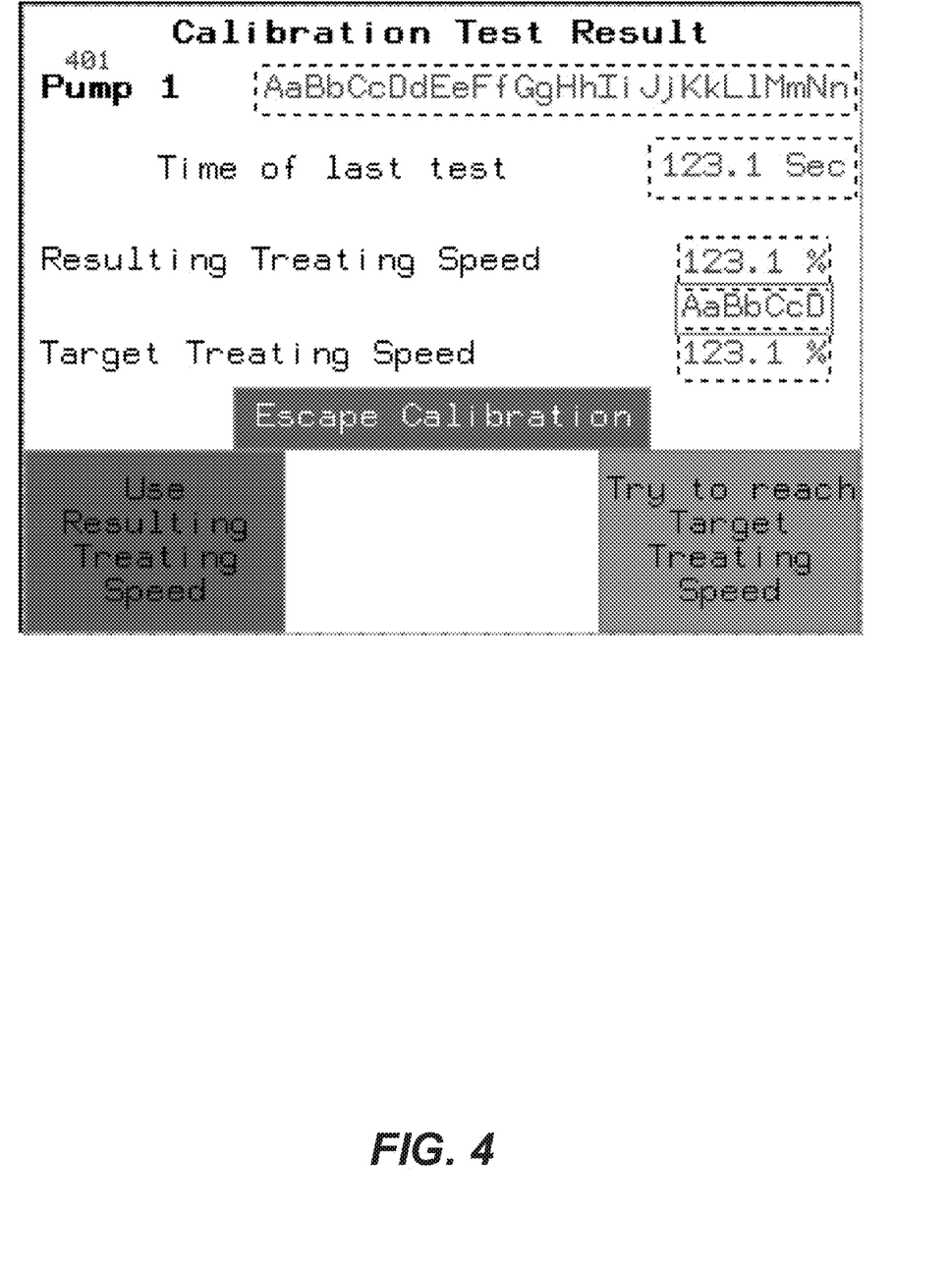
FIG. 4 depicts an exemplary user interface for the automatic calibration system of FIG. 1 showing a first result screen.

FIG. 4 depicts an exemplary first result screen. User interface elements are provided to use the resulting treating speed or to try to reach the target treating speed.

Figure 5:
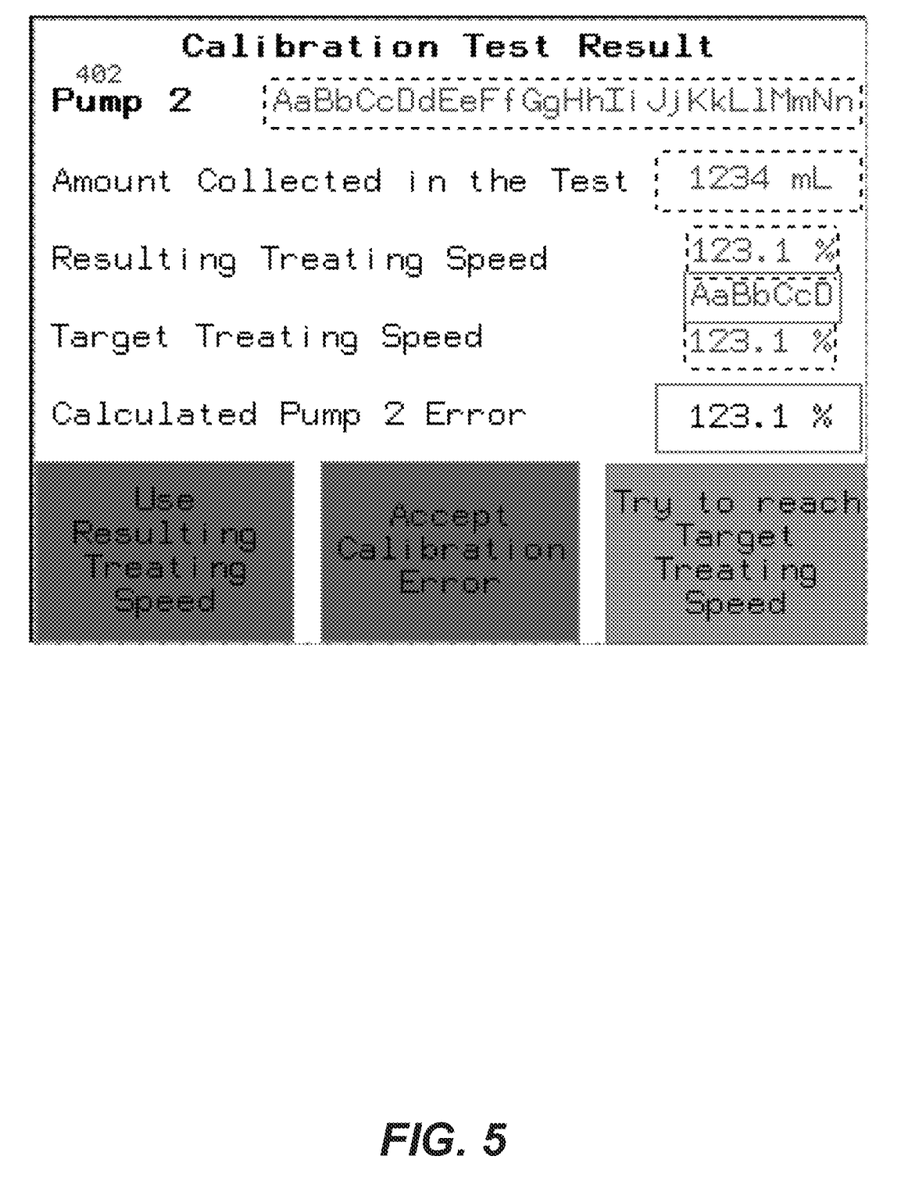
FIG. 5 depicts an exemplary user interface for the automatic calibration system of FIG. 1 showing a second result screen.

FIG. 5 depicts an exemplary second result screen. This screen provides user interface elements to use the resulting treating speed or to try to reach the target treating speed. In addition, a user interface element is provided to accept the calibration error.

Figure 6:
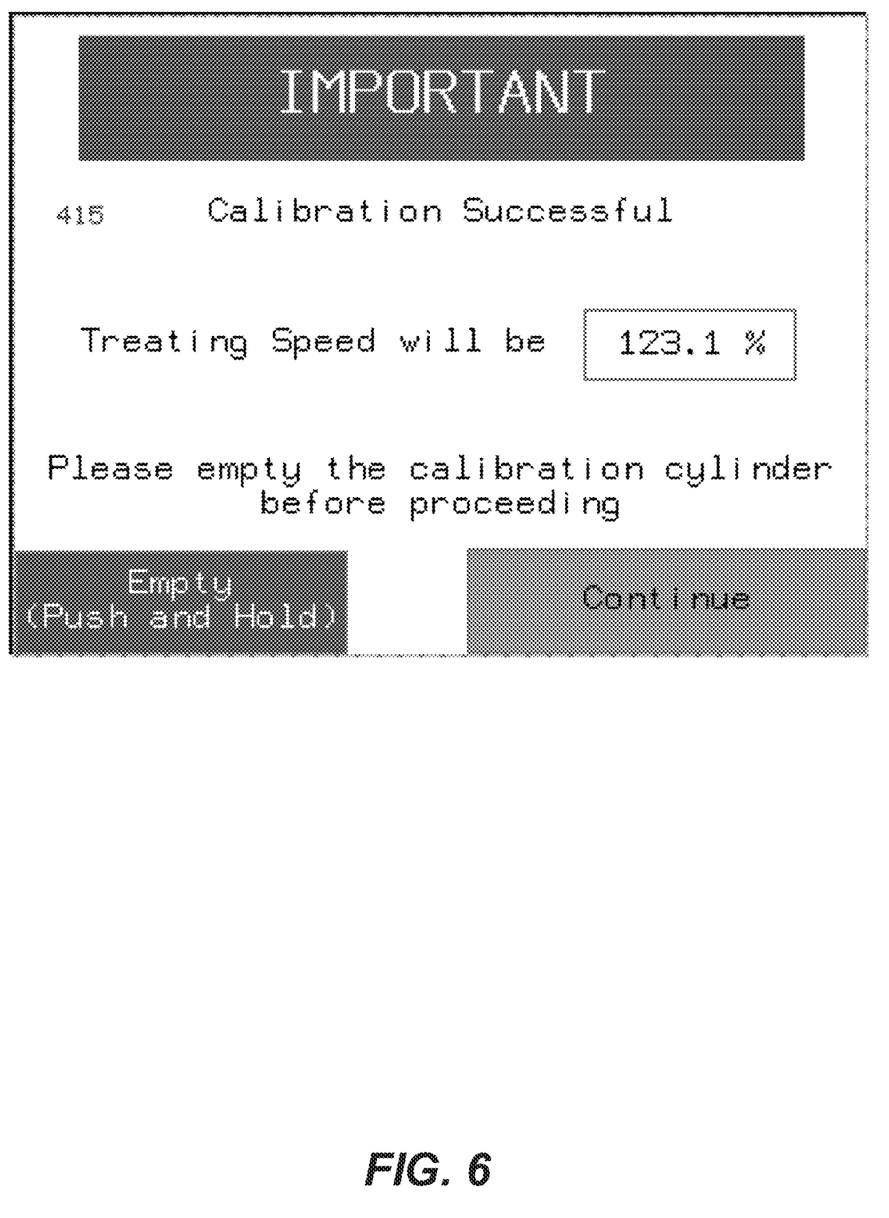
FIG. 6 depicts an exemplary user interface for the automatic calibration system of FIG. 1 showing a third result screen.

FIG. 6 depicts an exemplary third result screen showing that calibration has been successful. User interface elements are provided to empty the calibration cylinder and to continue with treatment.

Another aspect of the invention is a method of automatically calibrating a seed treater liquid delivery system. In general, the method entails pumping a seed treatment liquid using the seed treater pump, receiving the seed treatment liquid in a container such as a cylinder downstream, detecting when a predetermined volume of seed treatment liquid has filled the container using a first level sensor and a second level sensor and automatically adjusting a flow rate of the liquid in response to a time required to fill the container. Adjusting the flow rate of the liquid may involve adjusting a speed of the seed treater pump. The method may optionally also include a step of operating a valve to control flow of the seed treatment liquid to an applicator.

The method may further comprise first bleeding air from the system (from the container and line). In the case where the container is a cylinder, bleeding the air may be accomplished by lifting the piston to the top of the cylinder, then opening the valve (e.g. ball valve) to vent air. The pump is operated until the cylinder is full and liquid flows past the ball valve. The valve is then closed. The method is best performed by using the pump to push the air out of the cylinder until the air is gone and the piston moves. Once the air is removed from the cylinder, the valve is closed and the piston will then start moving with the liquid level. This valve is in some instances referred to as a "top valve". The value generally works best when located at the top of the piston rod because air cannot enter a vertical column of liquid from the top. However, this valve could be placed elsewhere as long as it does not allow air to affect the calibration.

The calibration method ensues by reversing the pump until a volume in the cylinder reaches the first level switch. The calibration test is then started. The liquid is filled into the cylinder until the second level switch is reached. The controller measures the elapsed time, thus giving a flow rate. The calibration test may be re-run any number of times until the desired (target) flow rate is reached. The controller will automatically adjust the flow of the liquid until the target flow rate is reached. Once the target flow rate is reached, treatment may begin. The pump is reversed to lower the level of liquid in the cylinder to the first level sensor. The piston is then locked in the retracted position. The ball valve is then opened so that the pump can begin to pump treatment liquid to the applicator.

The method may further comprise filling the cylinder until the second level sensor is reached and measuring the time required to reach the second level sensor.

The calibration may be applied in other embodiments to a metering system such as a flow meter or a loss-in-weight system.

In the illustrated embodiment, the flow rate is controlled by adjusting the speed of the pump. However, in other embodiments, the flow rate may be controlled using a flow control valve or by using a variable displacement pump whose output can be changed, not by changing speed, but by changing the volume output per revolution.

In the foregoing embodiment, the calibration is accomplished by measuring the time required to fill a fixed (predetermined) volume of the cylinder. In another embodiment, which is now described below with reference to FIG. 7, the calibration is accomplished by measuring the volume of liquid that is filled in the cylinder in a fixed (predetermined) amount of time. Measuring the amount of liquid delivered in a fixed time period can be accomplished using a transducer attached to the piston of the cylinder. There would be a maximum volume (based on cylinder size), and if this volume is reached prior to the fixed time elapsing, the system would report the time measurement. This embodiment provides a number of advantages. Some liquids need to be delivered at very low rates, and thus is would be useful to shorten the calibration time. It is also more accurate to calibrate based on steady-state flow. With two limit switches, it is only possible to measure an average flow rate. With a transducer attached to the piston, it is possible to actually measure the flow rate based on piston velocity.

Figure 7:
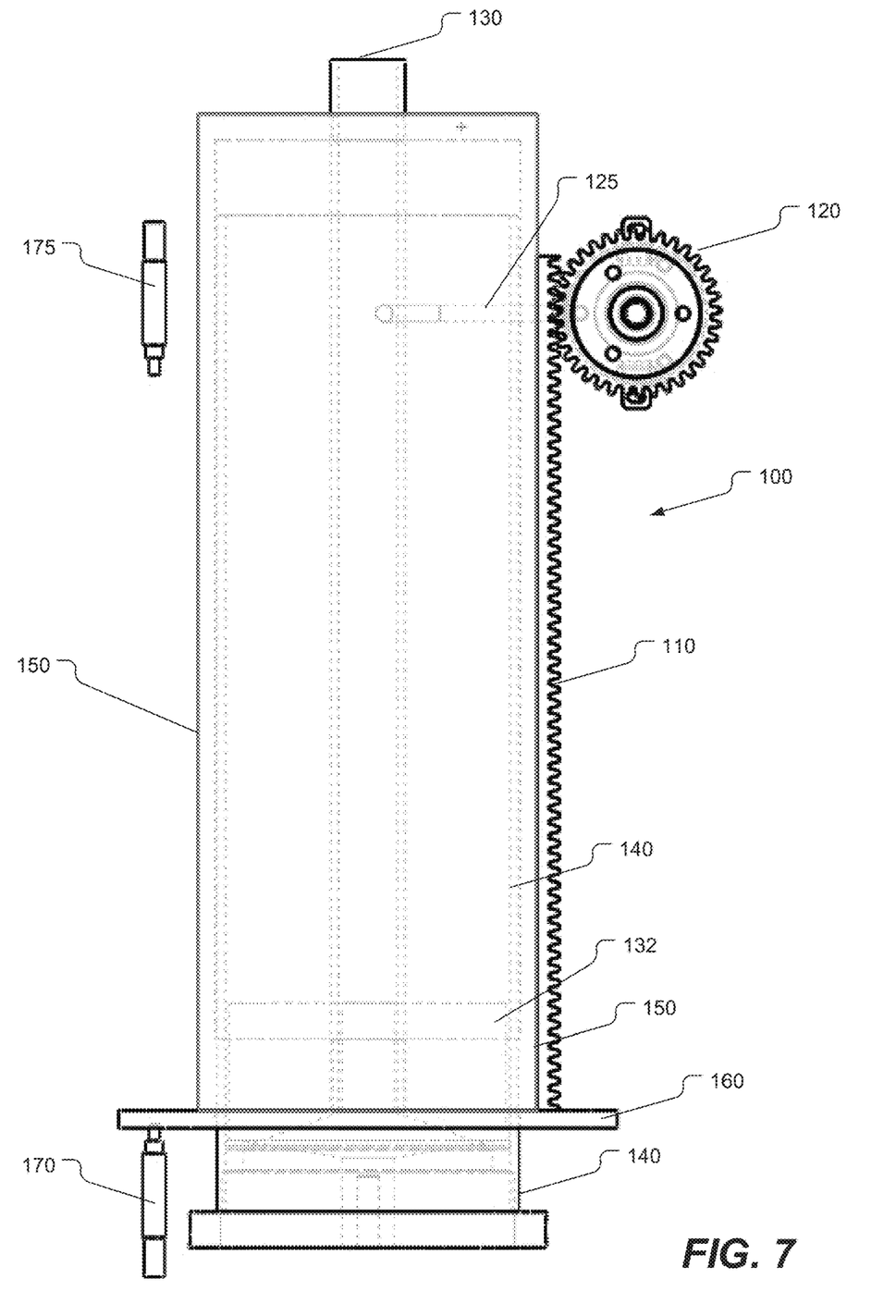
FIG. 7 depicts a pinion encoder and a rack for measuring the volume of liquid that fills the cylinder in a predetermined amount of time in accordance with another embodiment of the present invention.

FIG. 7 depicts an example system 100 for calibrating a seed treater by measuring the volume of treatment liquid that enters the cylinder during a fixed or predetermined amount of time. As depicted in FIG. 7, the system 100 includes a rack 110 and a pinion encoder 120, i.e. pinion having an encoder. Different mechanisms can be used, either with the pinion moving relative to a fixed rack or with a movable rack moving relative to a fixed pinion. Either the pinion or the rack is mechanically coupled to the piston rod 130 and its piston 132 such that linear displacement of the piston rod 130 and piston 132 results in relative motion of the rack and pinion.

In the example depicted in FIG. 7, the rack 110 moves relative to the pinion 120. The pinion 120 in this example is fixed relative to the cylinder 140. The piston rod 130 is connected via a nut at the top of the rod to an outer concentric sleeve 150 which slides relative to the cylinder 140 as the piston rod 130 moves. The sleeve 150 is affixed to a lower flange 160 that travels between optional lower and upper limit switches 170, 175. The level switches are not required. The encoder can determine the travel extents of the piston or rod within the cylinder. A switch or switches may be used as a back-up for the position of the piston or rod in the cylinder. In this embodiment, the rack 110 is thus linearly displaceable as the piston rod 130 moves relative to the cylinder 140. As the rack 110 moves relative to the pinion 120, the encoder on the pinion counts the pulses to determine the displacement of the rack 110 relative to the pinion 120. This linear displacement is then converted into an equivalent volume of the cylinder.

In another embodiment, which is based generally on the mechanism of FIG. 7, the pinion 120 is connected to the piston rod 130 of the cylinder 140 via a sliding arm 125 so that the pinion 120 is linearly movable over the rack 110 while the rack 110 is fixed relative to the cylinder 140. In this alternate embodiment, the arm 125 moves within a sealed vertical slot in the cylinder. As the piston rod moves, the pinion rolls along the rack. The encoder thus provides a linear displacement of the pinion relative to the rack, which is converted into a volume of liquid within the cylinder.

In another embodiment, the encoder can be attached to the top of the piston rod.

It will be appreciated that the rack and pinion with rotary encoder is merely one exemplary mechanism and that other mechanisms may be used to measure the volume of liquid that fills the cylinder in a given time. Likewise, the concentric sleeve and cylinder is merely one exemplary configuration for achieving relative linear motion. It will be understood that other mechanisms and configurations may be used to achieve a similar result.

The method or methods disclosed herein may be implemented in hardware, software, firmware or any combination thereof. Where implemented as software, the method steps, acts or operations may be programmed or coded as computer-readable instructions and recorded electronically, magnetically or optically on a fixed, permanent, non-volatile or non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

This method, system and computer-readable medium has been described in terms of specific embodiments, implementations and configurations which are intended to be exemplary only. Persons of ordinary skill in the art will appreciate, having read this disclosure, that many obvious variations, modifications and refinements may be made to the method, system and computer-readable medium.

It is to be understood that the singular forms "a", "an" and "the" include plural referents unless the context clearly dictates otherwise. Thus, for example, reference to "a device" includes reference to one or more of such devices, i.e. that there is at least one device. The terms "comprising", "having", "including", "entailing" and "containing", or verb tense variants thereof, are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g. "such as") is intended merely to better illustrate or describe embodiments of the invention and is not intended to limit the scope of the invention unless otherwise claimed.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the inventive concept(s) disclosed herein.

The invention claimed is:

1. A method of automatically calibrating a liquid treatment system in a seed treater, the method comprising:
pumping a seed treatment liquid using a seed treater pump;
receiving the seed treatment liquid in a container having a piston defining an upstream side against which the seed treatment liquid presses and a downstream side that also defines a rod-side of the piston, wherein the downstream side is open to atmosphere, wherein the piston includes a permanently open fluid passage through which the seed treatment liquid can selectively flow by operating a valve downstream of the piston;

detecting, by a controller, when a predetermined volume of seed treatment liquid has filled the container using a first level sensor and a second level sensor connected to the controller; and automatically adjusting, by the controller, a flow rate of the liquid in response to a time required to fill the container.

2. The method of claim 1 wherein automatically adjusting the flow rate comprises automatically adjusting, by the controller, a speed of the pump.

3. The method of claim 1 further comprising first bleeding air from the container.

4. The method of claim 1 further comprising reversing the pump to move the piston within the container until a volume in the container reaches the first level sensor.

5. The method of claim 4 further comprising filling the container until the second level sensor is reached and measuring the time required for the piston to reach the second level sensor.

6. The method of claim 1 wherein the container is a vertical cylinder in which a piston moves vertically.

7. A method of automatically calibrating a liquid treatment system in a seed treater, the method comprising:

pumping a seed treatment liquid using a seed treater pump;

receiving the seed treatment liquid in a container having a piston defining an upstream side against which the seed treatment liquid presses and a downstream side that also defines a rod-side of the piston, wherein the downstream side is open to atmosphere, wherein the piston includes a permanently open fluid passage through which the seed treatment liquid can selectively flow by operating a valve downstream of the piston;

measuring, using a transducer, a volume of seed treatment liquid in the container after a predetermined amount of time; and automatically adjusting, by a controller, a flow rate of the liquid in response to the volume measured after the predetermined amount of time.

8. The method of claim 7 wherein the container is a single-acting cylinder having a piston rod connected to the piston.

9. The method of claim 8 wherein the step of measuring the volume of liquid is performed using a pinion encoder and a rack, wherein the pinion encoder and the rack act as the transducer.

10. The method of claim 9 wherein the rack is movable with the piston rod of the cylinder.

11. The method of claim 10 wherein a concentric sleeve is movable with the piston rod and the rack.

* * * * *